US011495026B2

United States Patent
Nakano et al.

(10) Patent No.: US 11,495,026 B2
(45) Date of Patent: Nov. 8, 2022

(54) AERIAL LINE EXTRACTION SYSTEM AND METHOD

(71) Applicant: HITACHI SOLUTIONS, LTD., Tokyo (JP)

(72) Inventors: Sadaki Nakano, Tokyo (JP); Nobutaka Kimura, Tokyo (JP); Kishiko Maruyama, Tokyo (JP); Nobuhiro Chihara, Tokyo (JP)

(73) Assignee: HITACHI SOLUTIONS, LTD., Tokyo (JP)

( * ) Notice: Subject to any disclaimer, the term of this patent is extended or adjusted under 35 U.S.C. 154(b) by 139 days.

(21) Appl. No.: 17/047,416

(22) PCT Filed: Jan. 16, 2019

(86) PCT No.: PCT/JP2019/001046
§ 371 (c)(1),
(2) Date: Oct. 14, 2020

(87) PCT Pub. No.: WO2020/044589
PCT Pub. Date: Mar. 5, 2020

(65) Prior Publication Data
US 2021/0142074 A1    May 13, 2021

(30) Foreign Application Priority Data

Aug. 27, 2018   (JP) .............................. JP2018-158445

(51) Int. Cl.
*G06K 9/00*     (2022.01)
*G06K 9/32*     (2006.01)
*G06V 20/56*    (2022.01)
*G06T 7/11*     (2017.01)
(Continued)

(52) U.S. Cl.
CPC ................ *G06V 20/56* (2022.01); *G06T 7/11* (2017.01); *G06T 11/001* (2013.01); *G06V 10/25* (2022.01);
(Continued)

(58) Field of Classification Search
CPC ........ G06V 20/56; G06V 10/25; G06V 10/50; G06T 7/11; G06T 11/001; G06T 2207/10028
See application file for complete search history.

(56) References Cited

U.S. PATENT DOCUMENTS 8,244,026 B2 *  8/2012  Nahari .................... G06V 20/13
                                                382/285
9,235,763 B2 *  1/2016  Joyce ...................... G06V 20/13
(Continued)

FOREIGN PATENT DOCUMENTS

JP      2009-068951 A    4/2009
JP      2010-218362 A    9/2010
(Continued)

OTHER PUBLICATIONS

Korean Office Action dated Jul. 19, 2021 for Korean Patent Application No. 10-2020-7028756.

*Primary Examiner* — Gregory M Desire
(74) *Attorney, Agent, or Firm* — Volpe Koenig

(57) ABSTRACT

A technique facilitates selecting and designating an arbitrary one of a plurality of aerial lines. The aerial line extraction system, includes: an area-of-interest cropping unit that crops a region where an aerial line is assumed to exist as an area of interest by setting a support of the aerial line as a reference from a three-dimensional point cloud data; an element segmenting unit that segments the area of interest into a plurality of subdivided areas, obtains a histogram by counting three-dimensional point clouds existing in each of the subdivided areas, and obtains a segmentation plane of the area of interest on the basis of the histogram; and an element display unit that segments the area of interest into a plurality of segmented areas by the segmentation plane and (Continued)

displays the three-dimensional point clouds included in each of the segmented areas in a distinguishable manner.

14 Claims, 13 Drawing Sheets

(51) Int. Cl.
  *G06T 11/00* (2006.01)
  *G06V 10/25* (2022.01)
  *G06V 10/50* (2022.01)
(52) U.S. Cl.
  CPC .... *G06V 10/50* (2022.01); *G06T 2207/10028* (2013.01)

(56) References Cited

U.S. PATENT DOCUMENTS

| | | | |
|---|---|---|---|
| 9,406,138 B1* | 8/2016 | St-Pierre | G06T 7/181 |
| 9,542,738 B2* | 1/2017 | Schultz | G06T 7/13 |
| 10,008,123 B2* | 6/2018 | Chen | G08G 5/0086 |
| 10,380,423 B2* | 8/2019 | Pittman | G06V 20/176 |
| 10,539,676 B2* | 1/2020 | Li | G01S 17/89 |
| 11,029,211 B2* | 6/2021 | Frank | G01J 5/061 |
| 2005/0007450 A1 | 1/2005 | Hill et al. | |
| 2013/0300740 A1* | 11/2013 | Snyder | G06T 17/05 345/419 |
| 2014/0177928 A1 | 6/2014 | Bangay | |
| 2014/0192050 A1* | 7/2014 | Qiu | G06V 20/653 345/420 |
| 2017/0248969 A1* | 8/2017 | Ham | G08G 5/0086 |
| 2018/0218214 A1* | 8/2018 | Pestun | G06T 17/05 |

FOREIGN PATENT DOCUMENTS

| | | |
|---|---|---|
| JP | 2014-520307 A | 8/2014 |
| JP | 2015-001901 A | 1/2015 |
| WO | 2005/017550 A1 | 2/2005 |

\* cited by examiner

AERIAL LINE EXTRACTION SYSTEM AND METHOD

TECHNICAL FIELD

The present invention relates to a method of processing a three-dimensional point cloud data, and more particularly to a technique for extracting an aerial line from a three-dimensional point cloud data.

BACKGROUND ART

In the related art, a technique of acquiring three-dimensional map information by using a camera or a laser distance measuring device has been known (for example, Patent Document 1).

CITATION LIST

Patent Document

Patent Document 1: JP 2010-218362 A

SUMMARY OF THE INVENTION

Problems to be Solved by the Invention

FIG. 1 is a perspective view illustrating an example in which a three-dimensional point cloud data is acquired by a laser distance measuring device. For example, while the three-dimensional point cloud data around a vehicle itself is acquired by a laser distance measuring device 102 mounted on a vehicle 101, the vehicle is allowed to travel, so that a three-dimensional map data can be generated. Such a technique is known as Mobile Mapping System (MMS).

The three-dimensional point cloud data includes not only roads 103, utility poles 104, or architectural structures such as buildings and signs, but also data of electric lines and communication lines installed in the air (collectively referred to as an aerial line 105). Such arrangement information of the aerial lines 105 is useful for the time of performing maintenance of electric lines, communication lines, and the like.

In a case where a laser beam 106 from the laser distance measuring device 102 is scanned at a predetermined interval to collect the three-dimensional point cloud data, since the intensity of the laser beam 106 decreases in inverse proportion to the square of the distance, accuracy decreases as the distance to the object increases. Since the aerial line 105 has a distance from the laser distance measuring device 102 mounted on the vehicle 101 on the ground and also fluctuates due to wind or the like, there is a possibility that data is missing.

FIG. 2 illustrates an example of the three-dimensional point cloud data acquired in FIG. 1. The three-dimensional point cloud data includes a point cloud 203 of roads, a point cloud 204 of utility poles, and a point cloud 205 of aerial lines. The point cloud 205 of aerial lines has missing portions 206 and 207 of data. For this reason, in order to generate the three-dimensional map data from the acquired three-dimensional point cloud data, it is necessary to supplement the missing data of the three-dimensional point cloud data.

As one of the methods of supplementing such a missing portion of data, it is conceivable that the acquired three-dimensional point cloud data is displayed on a display and a user supplements a location where data should be supplemented by designating the portion.

FIG. 3 conceptually illustrates a process of supplementing the missing portions of the three-dimensional point cloud data of FIG. 2 displayed on the display. The point cloud 205 of the aerial line has the missing portions 206 and 207 of data. In order to supplement the missing portions, the user designates, for example, the aerial lines at both ends of the missing portions and supplements the missing portions by interpolation or extrapolation. For example, in order to supplement the missing portion 206, points 301 and 302 are designated, and the missing portion 206 between the points is supplemented. In addition, in order to supplement the missing portion 207, points 302 and 303 are designated, and the missing portion 207 between the points is supplemented. Alternatively, by selecting the three points 301, 302, and 303 with a mouse and performing supplementation processing by, for example, suspension curve approximation, the missing portions 206 and 207 can be supplemented.

However, in the case of trying to select a specific point in the three-dimensional space by using a pointer such as a mouse, there is a problem that another point in the depth direction interferes with the selection of a target point. For example, when an attempt is made to select the point 302, it is difficult to select the point 302 because the preceding point 304 interferes. Alternatively, even if an attempt is made to select the point 302, it is possible to mistakenly select the preceding point 304.

Especially, in the case of selecting a point from one of the aerial lines in which a plurality of aerial lines are arranged in parallel, since the three-dimensional point cloud data is displayed two-dimensionally on the display, it is difficult to select an arbitrary one from the aerial lines.

Therefore, an object of the present invention is to provide a technique that facilitates selecting and designating an arbitrary one of a plurality of aerial lines.

Solutions to Problems

According to a preferred aspect of the present invention, there is provided an aerial line extraction system, including: an area-of-interest cropping unit that crops a region where an aerial line is assumed to exist as an area of interest by setting a support of the aerial line as a reference from a three-dimensional point cloud data; an element segmenting unit that segments the area of interest into a plurality of subdivided areas, obtains a histogram by counting three-dimensional point clouds existing in each of the subdivided areas, and obtains a segmentation plane of the area of interest on the basis of the histogram; and an element display unit that segments the area of interest into a plurality of segmented areas by the segmentation plane and displays the three-dimensional point clouds included in each of the segmented areas in a distinguishable manner.

According to another preferred aspect of the present invention, there is provided an aerial line extracting method of extracting an aerial line by processing a three-dimensional point cloud data by using an information processing apparatus including a processing device, a storage device, an input device, and an output device. This method includes: a first step of reading the three-dimensional point cloud data including an aerial line and a support of the aerial line from the storage device; a second step of cropping a region where the aerial line is likely to be included as an area of interest by setting the support of the read three-dimensional point cloud data as a reference; a third step of segmenting the area of interest into a plurality of subdivided areas having the same shape and the same volume; a fourth step of counting the number of three-dimensional point clouds included in each of the subdivided areas; a fifth step of extracting a plane in which a distribution of the three-dimensional point clouds becomes sparse with respect to surroundings as a segmentation plane from the result of a counting; and a sixth step of segmenting the area of interest by the segmentation plane, classifying the three-dimensional point cloud included in the area of interest into a plurality of elements, and performing at least one of different displays and different processes for each of the plurality of elements.

Effects of the Invention

It becomes easy to select and designate any one of a plurality of aerial lines.

MODE FOR CARRYING OUT THE INVENTION

Figure 1:
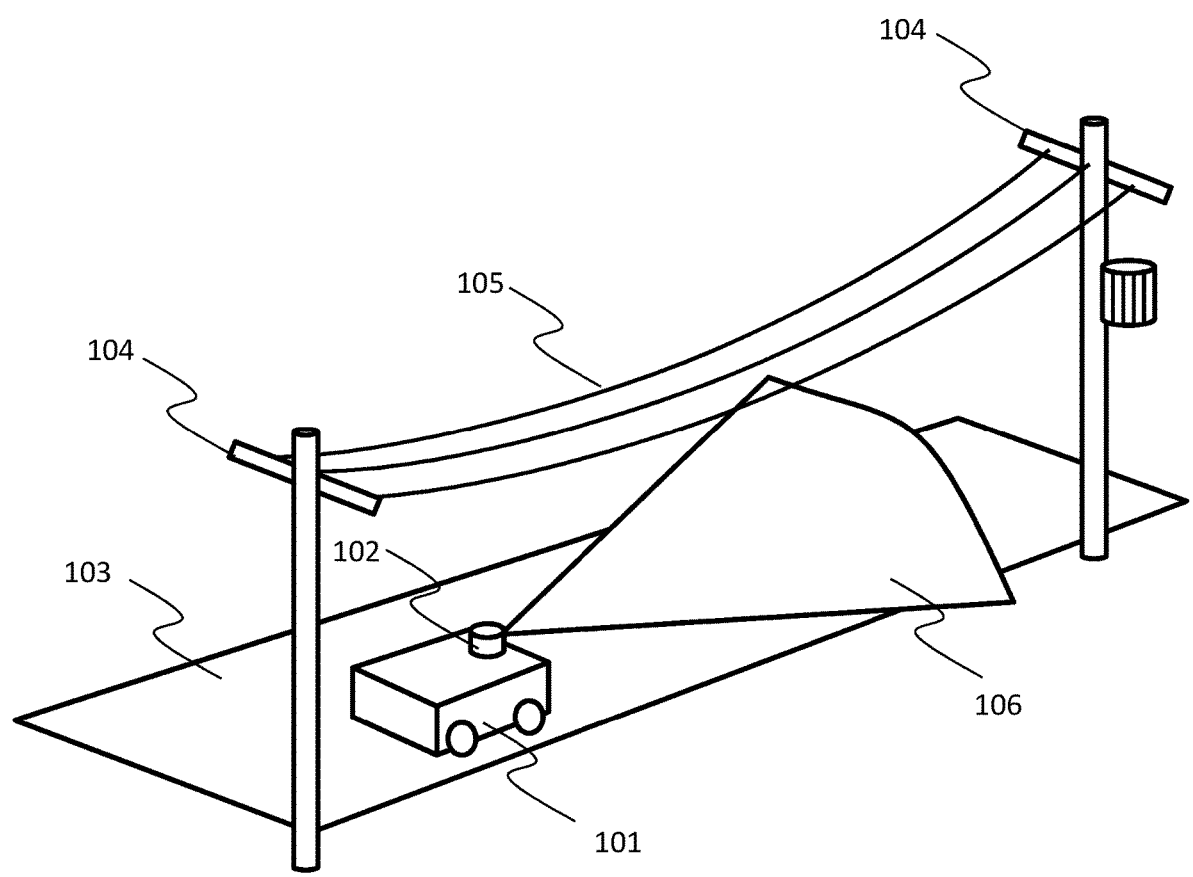
FIG. 1 is a perspective view illustrating an example in which a three-dimensional point cloud data is acquired by a laser distance measuring device.

Embodiments will be described in detail with reference to the drawings. However, the present invention is not to be construed as being limited to the description of the embodiments below. It is easily understood by those skilled in the art that the specific configuration can be changed without departing from the idea or the spirit of the present invention.

In this specification, the same reference numerals are commonly used for the same portions or portions having the same functions in different figures, and redundant description thereof may be omitted.

In a case where there are a plurality of elements having the same or similar functions, the description may be made with the same reference numerals attached with different subscripts. However, in a case where it is not necessary to distinguish a plurality of elements, the description may be made with the subscripts omitted.

The notations such as "first", "second", and "third" in this specification and the like are given to identify components, and thus, the notations do not necessarily limit the number, order, or contents thereof. In addition, the numbers for identifying the components are used for each context, and thus, the numbers used in one context do not always indicate the same configuration in other contexts. In addition, it is not prevented that the component identified by a certain number also has the component identified by another number.

The position, size, shape, range, or the like of each component illustrated in the drawings and the like may not represent the actual position, size, shape, range, or the like for easy understanding of the invention. For this reason, the present invention is not necessarily limited to the position, size, shape, range, or the like disclosed in the drawings and the like.

In this specification, a component in a singular form includes a plural form unless a particular context is clearly dictated.

The outline of the embodiment will be described below. In the embodiment, an area where an aerial line is assumed to exist is cropped as an area of interest from a three-dimensional point cloud data by setting a support (for example, a utility pole) of an aerial line as a reference. In the case of assuming an aerial line between two utility poles, the area of interest is, for example, a rectangular parallelepiped existing between the two utility poles. In the case of assuming an aerial line (lead-in line) led from one utility pole into a building, the area of interest is, for example, a cylinder having one utility pole as the central axis.

If the area of interest is determined, the area of interest is segmented into a plurality of subdivided areas (hereinafter, referred to as "slices") having the same shape and the same volume with a plurality of planes (subdivision planes) approximately parallel to the longitudinal direction (extension direction) of the aerial line. In the case of assuming an aerial line between two utility poles, the subdivision plane is, for example, a plane that is perpendicular to the ground and parallel to a line connecting the utility poles. In the case of assuming an aerial line led from one utility pole into a building, the subdivision plane is, for example, a plane that is perpendicular to the ground and segments a cylinder at equal angles in the circumferential direction. When the slice is thin, for example, about several centimeters thick, it is possible to accurately identify adjacent aerial lines.

Next, a histogram is obtained by counting the three-dimensional point clouds existing in each slice. Then, the distribution of the three-dimensional point clouds is obtained, in which the portion where the three-dimensional point cloud of the aerial line exists becomes a mountain and the portion where the three-dimensional point cloud does not exist becomes a valley. Therefore, the area of interest is segmented by setting the portion which the valley becomes as a segmentation plane to obtain a plurality of segmented areas. Then, the three-dimensional point clouds (hereinafter, sometimes referred to as "elements") existing in each of the segmented areas belong to the same aerial line. As described above, since each aerial line can be identified by the segmented area, a user can easily designate a desired aerial line.

Therefore, for example, if two utility poles and electric lines between the two utility poles are exemplified, a three-dimensional point cloud including the utility poles and the electric lines is input, the input point cloud is segmented into a plurality of elements that are parallel to a line connecting the utility poles and the utility pole and perpendicular to the ground on the basis of the density, and each of the plurality of segmented elements is displayed on the display unit.

First Embodiment

Figure 4:
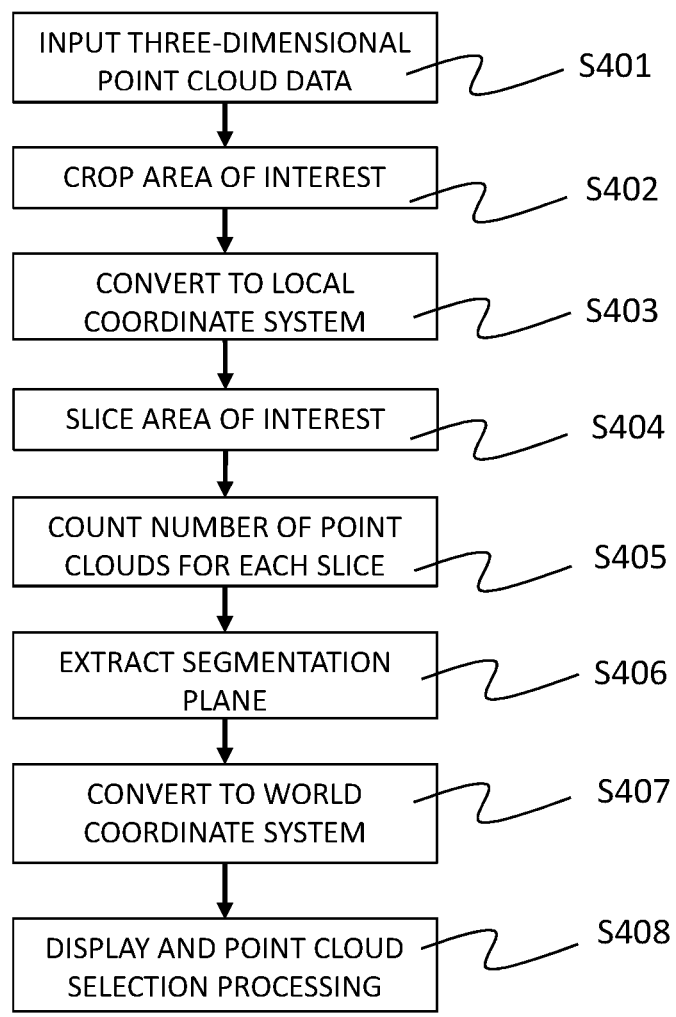
FIG. 4 is a flowchart illustrating a processing flow of an aerial line extraction system according to an embodiment.

FIG. 4 is a diagram illustrating a processing flow of an aerial line extraction system according to a first embodiment. The aerial line extraction system is realized by allowing a general information processing apparatus to process software, as described later.

Figure 2:
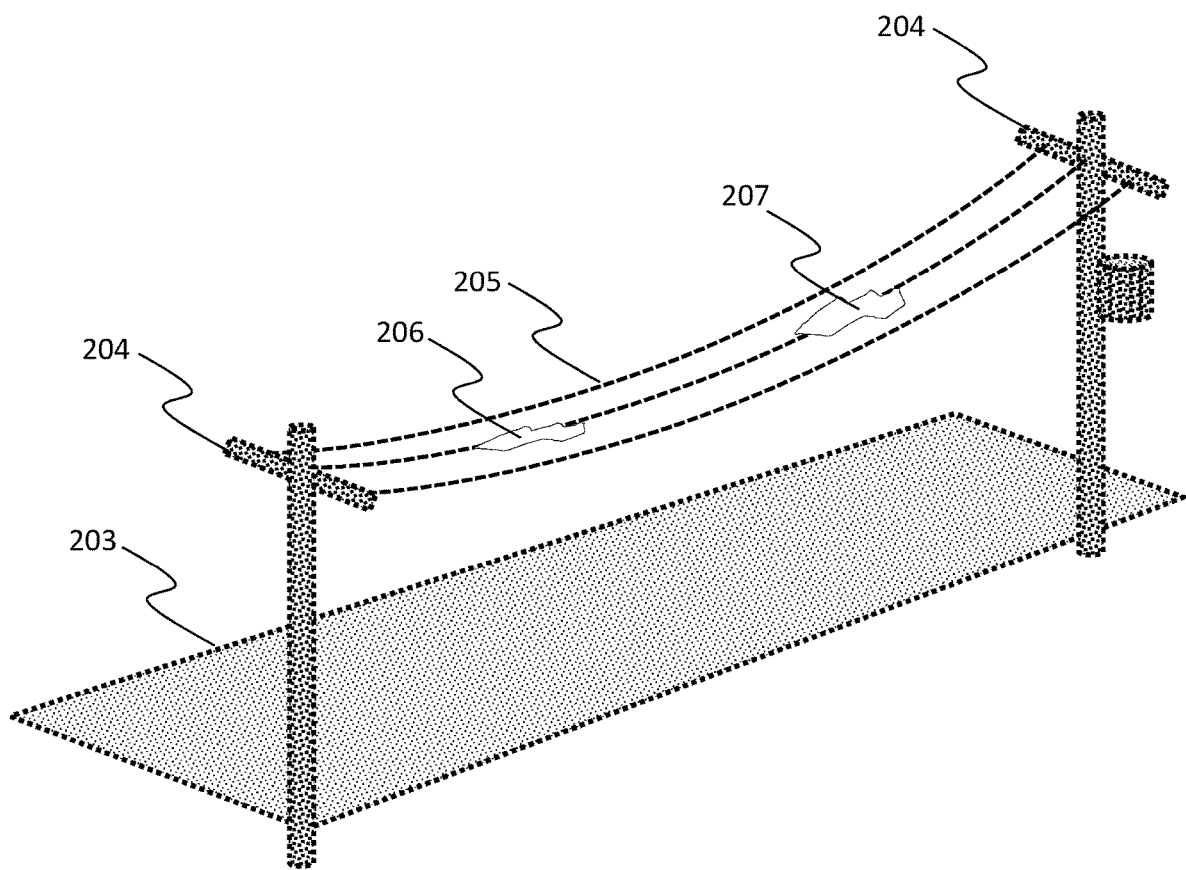
FIG. 2 is a conceptual diagram illustrating the three-dimensional point cloud data acquired by the laser distance measuring device.

In step S401, a three-dimensional point cloud data acquired by a method described in FIG. 1 is input to the information processing apparatus via an input interface. The three-dimensional point cloud data is a data of a point cloud as illustrated in FIG. 2. For example, in a case where a perpendicular coordinate system is employed, each point is represented by coordinates (x, y, z). The origin (0, 0, 0) of the coordinates, and the x-axis, y-axis, and z-axis can be arbitrarily determined, and these will be referred to as world coordinates. In addition, a spherical coordinate system or other coordinate systems may be used. The input three-dimensional point cloud data is stored in a storage device and used for subsequent processing.

In step S402, a portion where the point cloud 205 of the aerial lines is likely to exist is cropped from the three-dimensional point cloud data as an area of interest. The cropping method is not particularly limited, but for example, the cropping is performed by defining the portion as an area of interest of the space between the utility poles.

Figure 3:
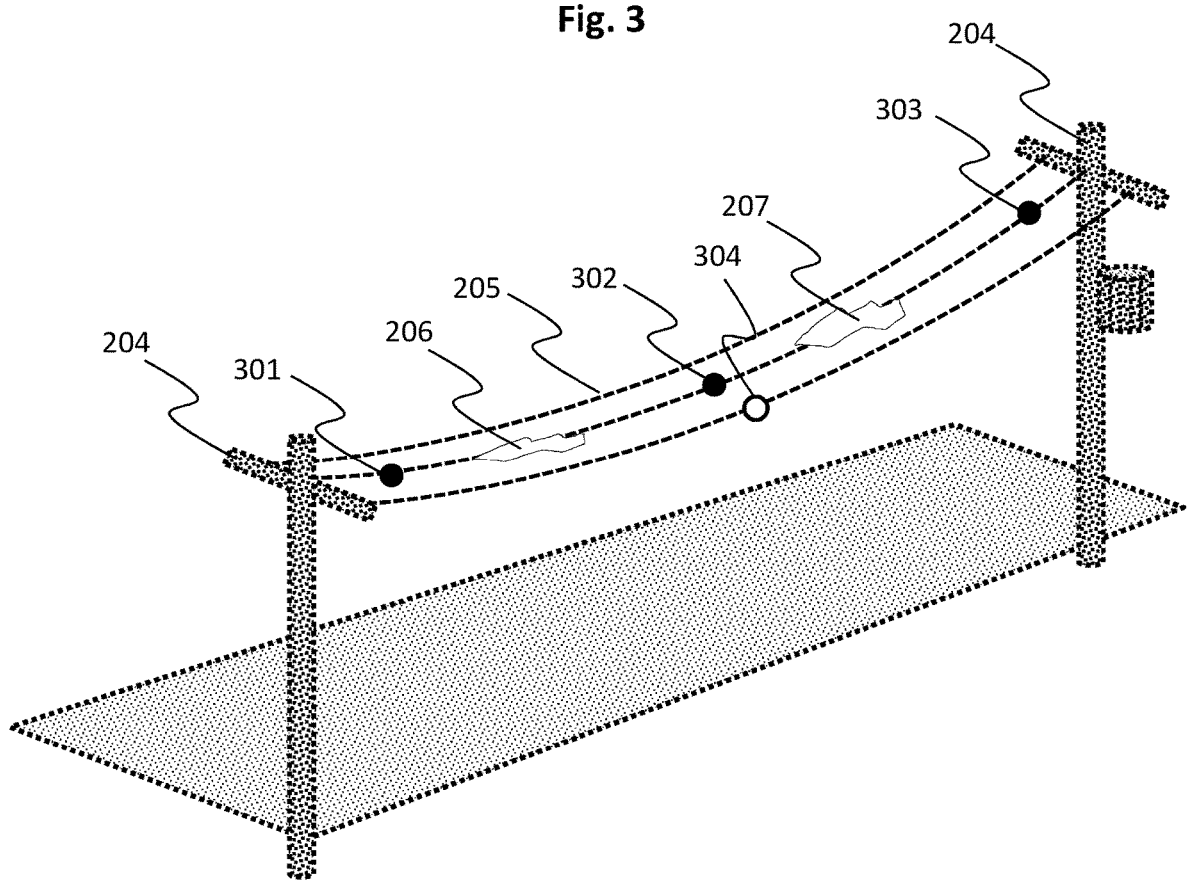
FIG. 3 is a conceptual diagram of a process of supplementing a missing portion of three-dimensional point cloud data.

As a specific method, the user designates two utility pole coordinates $(x_1, y_1)$ and $(x_2, y_2)$ by selecting two utility poles 104 by using a means such as a mouse click while viewing the three-dimensional point cloud data illustrated on the display as illustrated in FIG. 3. In a case where the coordinates of the utility pole 104 can be obtained from another database, the coordinates may be used.

Figure 5:
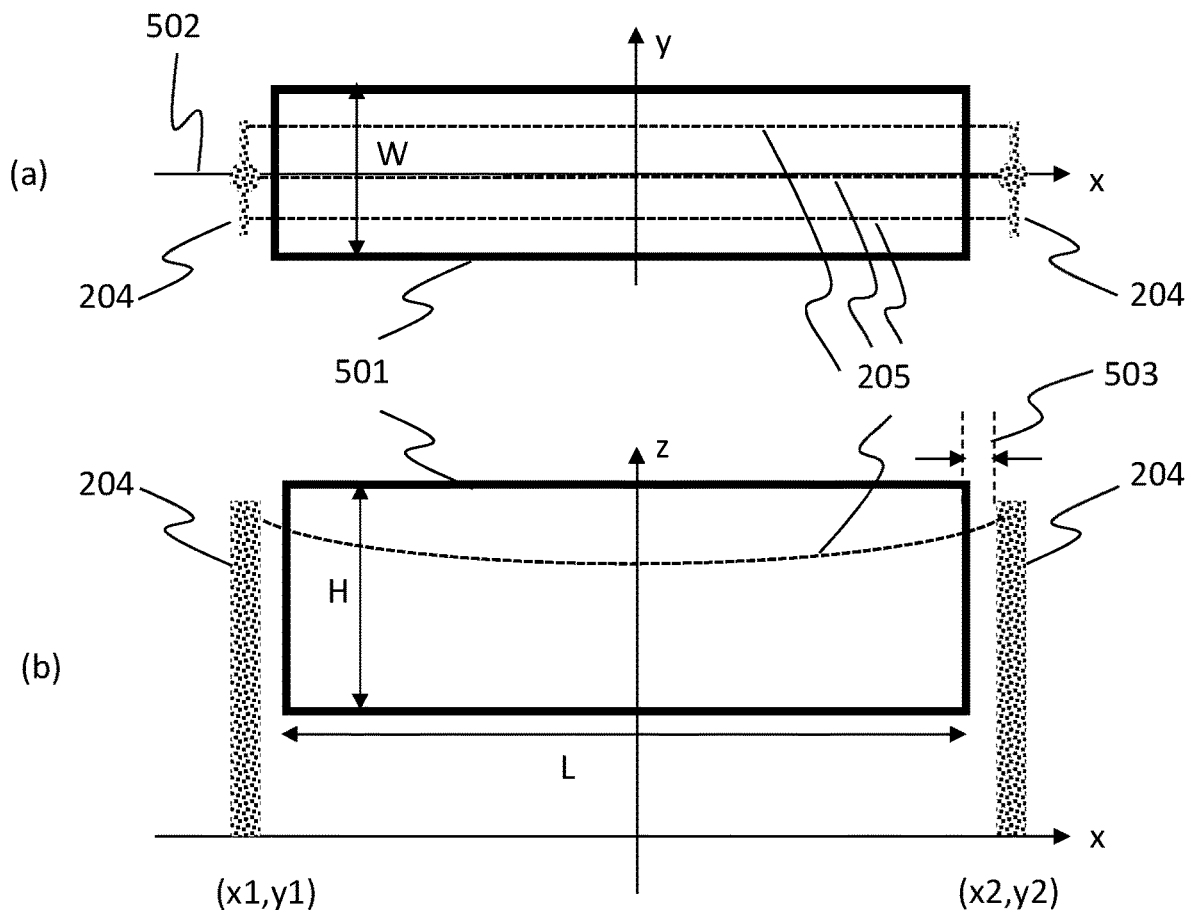
FIG. 5 is a two-surface diagram illustrating a concept of an area-of-interest cropping processing.

FIG. 5 is a diagram describing the concept of the area-of-interest cropping process. FIG. 5 illustrates the schematic diagram (a) of the three-dimensional point cloud data of FIG. 2 viewed from the upper side and the schematic diagram (b) viewed from the side. For the description, the local coordinates are employed, the longitudinal direction (extension direction) of the aerial line 105 (point cloud 205 of the aerial line) is set to x, the direction of gravity (direction perpendicular to the ground surface) is set to z, and the direction perpendicular to x and z is set to y.

As illustrated in FIG. 5, when the coordinates of the two utility poles 104 (point cloud 204 of utility poles) are obtained, the space between the two utility poles is cropped and set as the area of interest 501. For example, with respect to the line 502 connecting $(x_1, y_1)$ and $(x_2, y_2)$, a predetermined width W is defined in the vertical direction with the line 502 as the center in the xy plane. In addition, a predetermined height H is defined in the z direction (height direction). The range of the width W and the height H may be determined in advance and stored in the system as an the area definition file 807. With respect to a width with which the aerial lines are assumed to arranged, the width W is, for example, 1 m on both sides of the line 502 as a center. In addition, as a height at which the aerial line is assumed to be arranged, the height H has, for example, a region of 5 m to 10 m from the ground surface. The numerical values are examples and may be set arbitrarily. Since the point cloud in the area of interest is a point cloud in which the road 103, the utility pole 104, and the like are removed, the possibility of the aerial line 105 is high.

In addition, the length L of the area of interest 501 in the longitudinal direction may be the distance (distance between the utility poles 104) between $(x_1, y_1)$ and $(x_2, y_2)$. However, a gap 503 from the utility pole is defined in the area definition file, and the length L of the area of interest 501 in the longitudinal direction may be obtained from "distance between the utility poles–(gap from the utility pole*2)". By doing so, since attachments of the utility pole such as transformers and insulators can be excluded from the area of interest 501, the designation of the aerial line 105 becomes easier.

In addition, it can be considered that there are a wide variety of aerial line arrangements between utility poles, and the area-of-interest cannot be cropped uniformly. In such a case, various functions of displaying the image as illustrated in FIG. 3 or FIG. 5 on the display, displaying the range of the area of interest 501 based on the definition of the area definition file, and being capable of adjusting the position and range of the area-of-interest may be provided.

In step S403, the area of interest 501 is cropped, and after that, the world coordinates are converted into local coordinates. That is, the world coordinates of which origin is an arbitrary point are converted to the local coordinates in which the two utility poles 104 are on the x-axis and the centers of the two utility poles are the origin (x, y)=(0, 0). In addition, this conversion is not essential and may be omitted, but in order to simplify the following description, an example of conversion will be described in the embodiment.

In step S404, the area of interest 501 cropped from the three-dimensional point cloud data as a region where an aerial line is likely to exist is sliced with a plane (subdivision plane) including the longitudinal direction of the aerial line 105 (direction away from one of the utility poles 104) and the gravity direction. When an example of conversion to the local coordinate system in FIG. 5 is described, the area of interest 501 is segmented into a plurality of thin areas on the xz plane. The thickness of segmentation is defined in advance in the area definition file 807, and the thickness of segmentation is defined to be, for example, 5 cm. As a result, the area of interest 501 is segmented in the direction (y direction) in which the aerial lines 105 are aligned, and thus, a plurality of subdivided areas (slices) are generated. The slices usually have the same shape and the same volume.

According to the above processing, the length (the size in the x direction in the local coordinate system of FIG. 5) of the aerial line 105 of the slice in the longitudinal direction is equal to the length L of the area of interest 501. In addition, the size (the size in the z direction in the local coordinate system of FIG. 5) of the slice in the gravity direction is equal to the height H of the area of interest 501. Since the above-mentioned sizes and the size (the thickness T of the slice and the size in the y direction in the local coordinate system of FIG. 5) in the vertical direction are segmented, so that the thickness is remarkably small as compared with the length L and the height H. For example, the length L is several meters to several tens of meters, and the height H is several meters, whereas the thickness T of the slice is several centimeters to several tens of centimeters. Therefore, the distribution in the width direction of the point cloud 205 of the aerial line can be accurately identified.

In step S405, the number of three-dimensional point cloud data included in the slice is counted for each slice.

Figure 6:
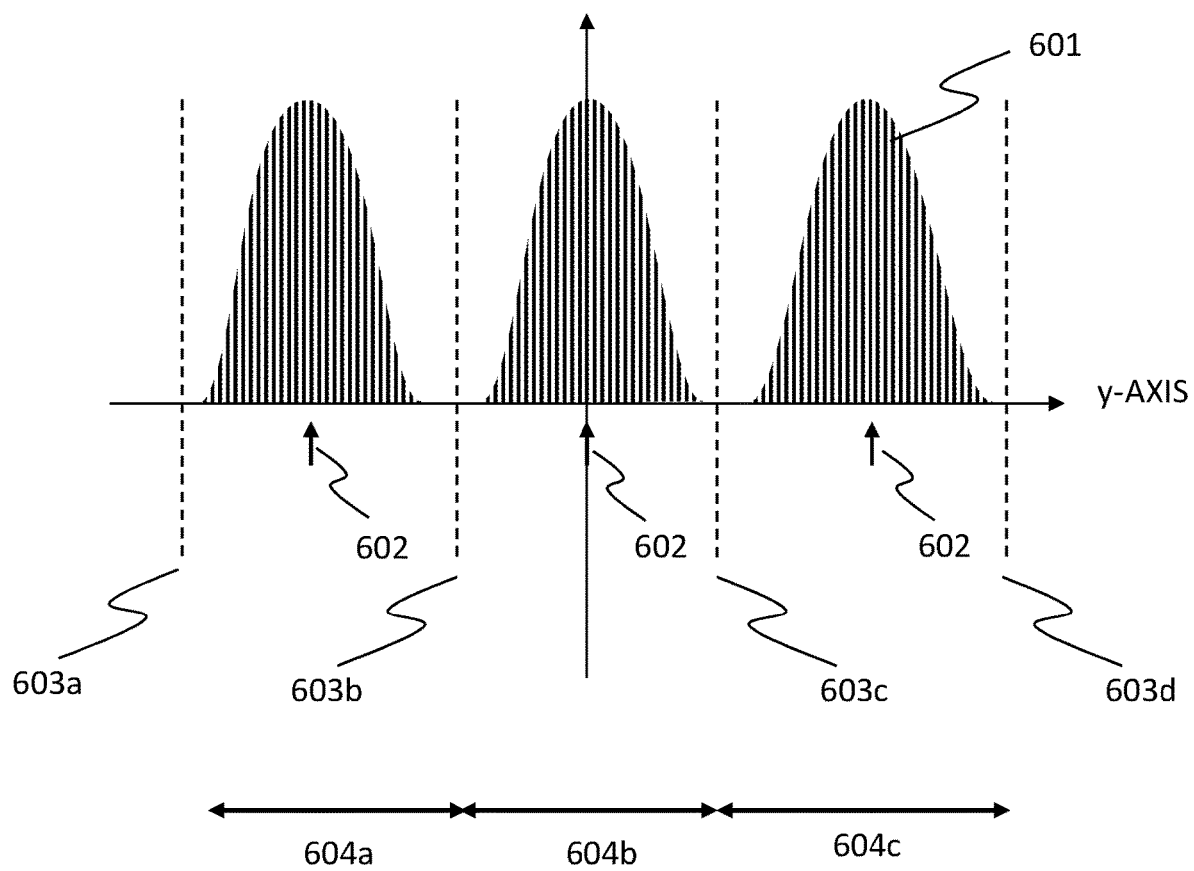
FIG. 6 is a graph showing the number of point cloud data counted for each slice.

FIG. 6 is a graph showing the number of the counted three-dimensional point cloud data. When the number of point clouds is counted for each slice sliced in the y direction and plotted on a graph, a histogram as shown in FIG. 6 is completed. In this example, since it is assumed that three aerial lines 105 are running in parallel, three peaks 602 are formed in the histogram 601 of the point cloud. One of the peaks 602 indicates one aerial line.

Therefore, in step S406, the valley portion of the histogram 601 is set as the segmentation plane 603, so that the three-dimensional point cloud data of the three aerial lines can be separated into the segmented areas 604a, 604b, and 604c. The histogram of FIG. 6 may be displayed on the display, and the segmentation plane 603 may be determined on the basis of information designated by the user corresponding to the display. Alternatively, a threshold value may be set, and a location where the number of point clouds is equal to or less than the threshold value may be automatically determined as a segmentation plane. As the thickness T of slice is smaller, the resolution of the histogram becomes higher. However, the thickness is determined in consideration of the trade-off with the processing time.

If the slices are approximately parallel to the longitudinal direction of the aerial line 105, the peaks and valleys of the histogram can be clearly identified as shown in FIG. 6. If the slice direction is inclined by a predetermined angle or more with respect to the longitudinal direction (x-axis direction in FIG. 5) of the aerial line 105, the peaks and valleys of the histogram may not be identified. However, in such a case, the peaks and valleys of the histogram may be identified by adjusting the angle of the slice direction.

Therefore, the technical meaning of "segments the area of interest approximately parallel to the longitudinal direction of the aerial line" is equivalent to "the peaks and valleys of the histogram of the three-dimensional point cloud can be identified".

In step S404, the area of interest 501 illustrated in FIG. 5 is sliced by setting the xz plane as a subdivision plane, and the x-axis is a line connecting the two utility poles 104. In the case of automatically slicing the area of interest 501, it is efficient to perform the slicing s uniformly, but in reality, there is no guarantee that the x-axis and the aerial line 105 are parallel. Therefore, it is desirable to be able to adjust the angle of the subdivision plane with respect to the x-axis.

In step S407, in a case where the coordinates are converted to the local coordinates in step S403, each segmentation plane 603 is returned to the world coordinates. Since the segmentation plane is a plane, the segmentation plane can be expressed by a plane equation (ax+by+cz+d=0). The planar parameters (a, b, c, d) are transmitted to the subsequent processing.

In step S408, the obtained segmentation plane 603 is used to separate the three-dimensional point cloud data into the respective elements included in the segmented areas 604a, 604b, and 604c, and the displaying of the three-dimensional point cloud and the selection processing of the point cloud of aerial lines are performed.

Figure 7:
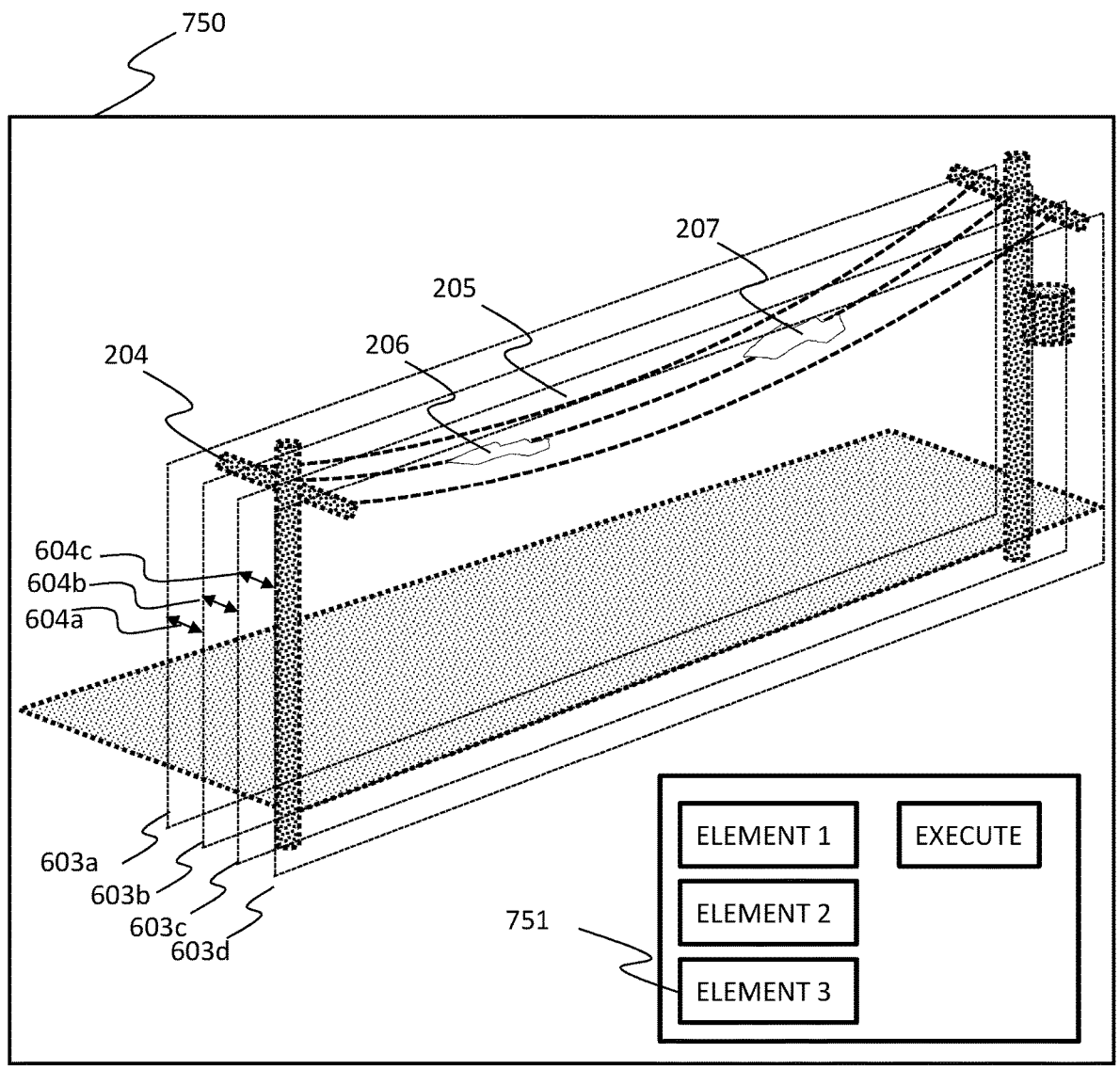
FIG. 7 is an image diagram of an element selection screen displayed on a display of a first embodiment.

FIG. 7 is an image of the element selection screen displayed on the display of the system according to the embodiment. The three-dimensional point cloud data illustrated in FIG. 2 is displayed on the display screen 750. Furthermore, segmentation planes 603a, 603b, 603c, and 603d are illustrated on the screen to be superimposed on the three-dimensional point cloud data. The segmentation plane 603 is a plane that extends to infinity represented by ax+by+cz+d=0, but in the figure, a portion thereof is illustrated as a quadrangle for the expression.

The segmented areas 604a, 604b, and 604c are areas partitioned by two adjacent segmentation planes 603. A manipulation button region 751 is displayed on the screen. In the manipulation button region 751, selection buttons of "element 1", "element 2", and "element 3" are arranged to correspond to the segmented areas 604a, 604b, and 604c, and in conjunction with the designation of the buttons, a point cloud (element) included in any of the segmented areas 604a, 604b, and 604c is displayed as a point cloud that is selectable with a mouse or the like.

There are various display methods, and although not particularly limited, there are the following methods. (1) The color of the point cloud of the selected element is displayed in a color different from those of other point clouds. (2) Only the point cloud of the selected element is displayed, and the other point clouds are not displayed. (3) Only the point cloud of the selected element is allowed to be selectable with the mouse or the like, and the other point clouds are allowed not to be selectable.

When the user selects a desired point from the selected point cloud of the aerial line and presses the "execute" button, the missing portions 206 and 207 of the point cloud are supplemented. The point designating method and the supplementation processing are not particularly limited, but various known supplementation methods may be applied. For example, three points of the start point, the end point, and the waypoint of the aerial line are selected, and a point cloud obtained by curve approximation (for example, suspension curve approximation) of the three points is output to supplement the missing portion. Alternatively, the ends of the aerial lines at both ends of the missing portion may be designated, and the space between the ends may be supplemented by a straight line or a curved line.

Figure 8:
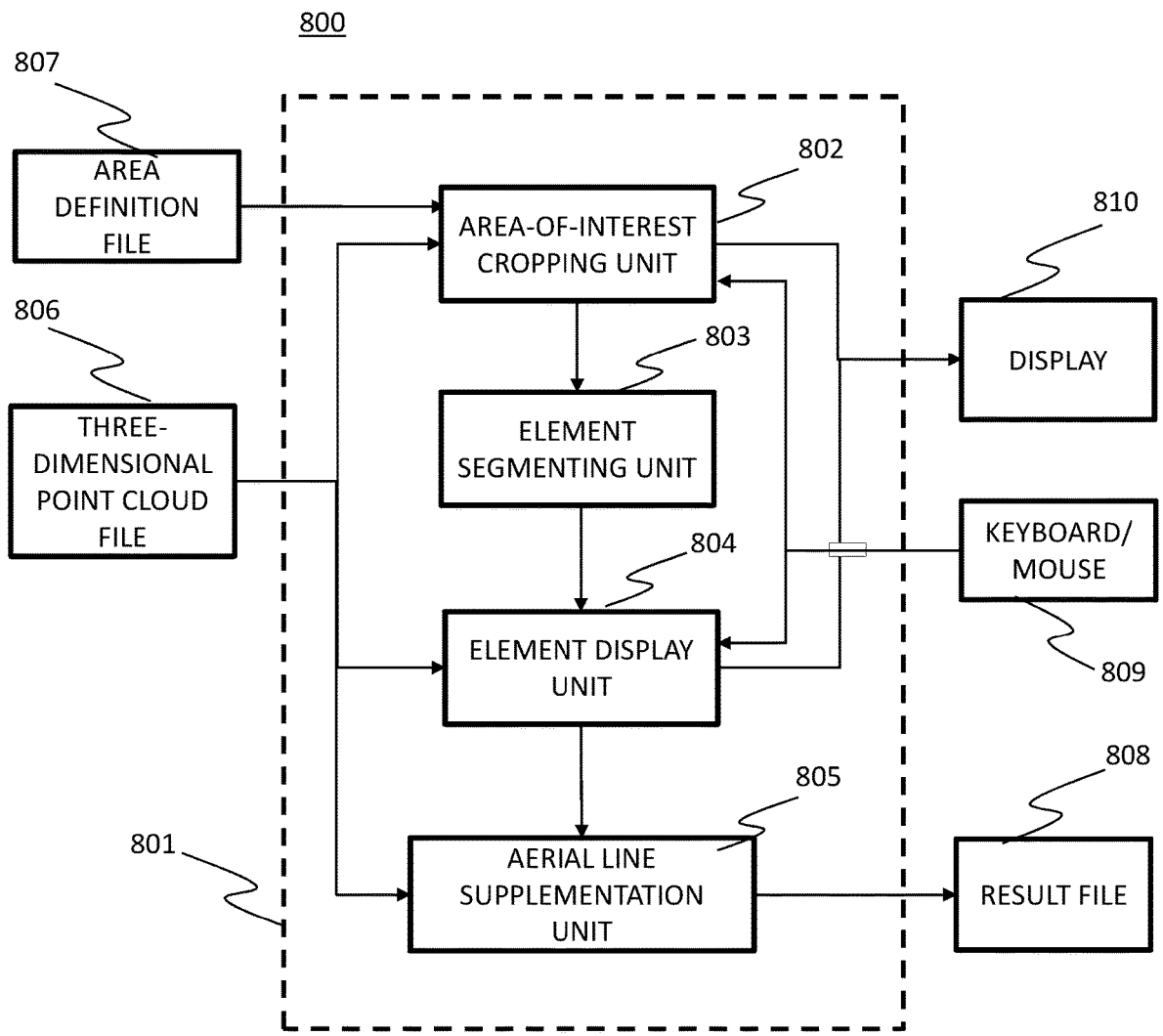
FIG. 8 is a block diagram illustrating a configuration of the aerial line extraction system according to the embodiment.

FIG. 8 is a system configuration diagram according to the embodiment. As described above, an aerial line extraction system 800 according to the embodiment is configured with a normal information processing apparatus (for example, a server) including a processing device, a storage device, an input device, and an output device. In FIG. 8, the processing device 801 includes an area-of-interest cropping unit 802, an element segmenting unit 803, an element display unit 804, and an aerial line supplementation unit 805. These configurations are implemented by the processing device executing software stored in the storage device. The storage device further stores a three-dimensional point cloud file 806, an area definition file 807, and a result file 808 as data. In addition, a keyboard/mouse 809 and a display 810 which are general input and output devices are provided. The aerial line extraction system 800 may have various configurations known as an information processing apparatus instead of or in addition to the aerial line extraction system.

The configuration of the aerial line extraction system 800 will be described in relation to the processing described in FIG. 4. The three-dimensional point cloud data input in step S401 is stored in the storage device as a three-dimensional point cloud file 806. As illustrated in FIG. 2, the three-dimensional point cloud data includes point cloud data of roads, utility poles, electric lines, and the like. Data inputting can be performed from a known data input port.

Data defining the size of each area are stored in the area definition file 807. As the data, for example, cropping information of the area of interest (sizes of above and below portions of the area of interest, a distance between the utility pole and the area of interest) and the thickness T of the slice of the segmented area are stored. These are determined and stored in advance by the user. A plurality of types of data may be stored, so that the user may select the type of data at the time of use.

The display 810 is used for displaying an image and displays the image as illustrated in FIG. 7. The keyboard/mouse 809 is an example of an input device. The input device designates a utility pole, a point, or the like in the area-of-interest cropping unit 802. In addition, the input device performs a process of designating element buttons in the manipulation button region 751 on the element display unit 804. The result file 808 stores the point cloud of the supplemented electric lines.

In process S402 of FIG. 4, the area-of-interest cropping unit 802 operates. The area-of-interest cropping unit 802 displays an image as illustrated in FIG. 2 on the display 810. When the user selects two utility poles 104 (point cloud 204 of utility poles) with the mouse, the area-of-interest cropping unit 802 obtains coordinate information of the two utility poles. Then, as described with reference to FIG. 5, the area-of-interest cropping unit 802 obtains the coordinates defining the area of interest 501 from the utility pole coordinates by referring to the area definition file 807. After that, the area-of-interest cropping unit 802 extracts the point cloud in the area of interest 501 from the three-dimensional point cloud data stored in the three-dimensional point cloud file 806.

In processing S403, the area-of-interest cropping unit 802 converts the extracted three-dimensional point cloud data to a local coordinate system, if necessary. The extracted three-dimensional point cloud data is transmitted to the element segmenting unit 803.

In step S404, the element segmenting unit 803 slices the area of interest 501 at regular intervals to generate subdivided areas (slices). After that, in processing S405, the element segmenting unit 803 counts the number of point clouds for each slice and creates the histogram described in FIG. 6.

After that, the element segmenting unit 803 determines the segmentation plane 603 at the valley portion of the histogram in processing S406, converts the segmentation plane 603 to the world coordinates as necessary in processing S407, and transmits the segmentation plane parameters (a, b, c, d) to the element display unit 804.

In step S408, the element display unit 804 displays the three-dimensional point cloud data on the display 810 as illustrated in FIG. 7. The element display unit 804 creates a list of the segmented areas 604 interposed between two adjacent segmentation planes 603 and reflects the list on the screen in association with the element of an element selection button. In conjunction with the pressing event of the element selection button by the user, the element display unit 804 displays a three-dimensional point cloud included in each of the segmented areas as element 1, element 2, and element 3 on the display 810 as a point cloud that can be selected with a mouse or the like. By allowing only a specific element to be selectable, it is possible to solve the problem that, due to the interference of another point in the front direction of the screen, the target point cannot be selected.

After that, the aerial line supplementation unit 805 performs calculation for supplementing the aerial line on the basis of the point selected by the user in step S408. A well-known method can be employed for the supplementation. The supplemented three-dimensional point cloud data obtained as a result is output as the result file 808 to the storage device or the outside of the system.

The aerial line extraction system 800 may be configured by a single server, or an arbitrary portion of the input device, the output device, the processing device, and the storage device may be configured by another server connected by a network. In addition, in the embodiment, the function equivalent to the function configured by software can be realized by hardware such as Field Programmable Gate Array (FPGA) and Application Specific Integrated Circuit (ASIC).

According to the embodiment described above, by extracting the plane in which the distribution of the three-dimensional point cloud becomes the most sparse with respect to the surroundings or is sparser than the threshold value and segmenting the area of interest, it is possible to easily extract or select arbitrary one of the aerial lines that are arranged to be adjacent in parallel Second Embodiment In the second embodiment, a modification of the segmentation plane extraction processing S406 in the processing flow illustrated in FIG. 4 will be described. Other portions may be the same as those of the first embodiment.

Figure 9:
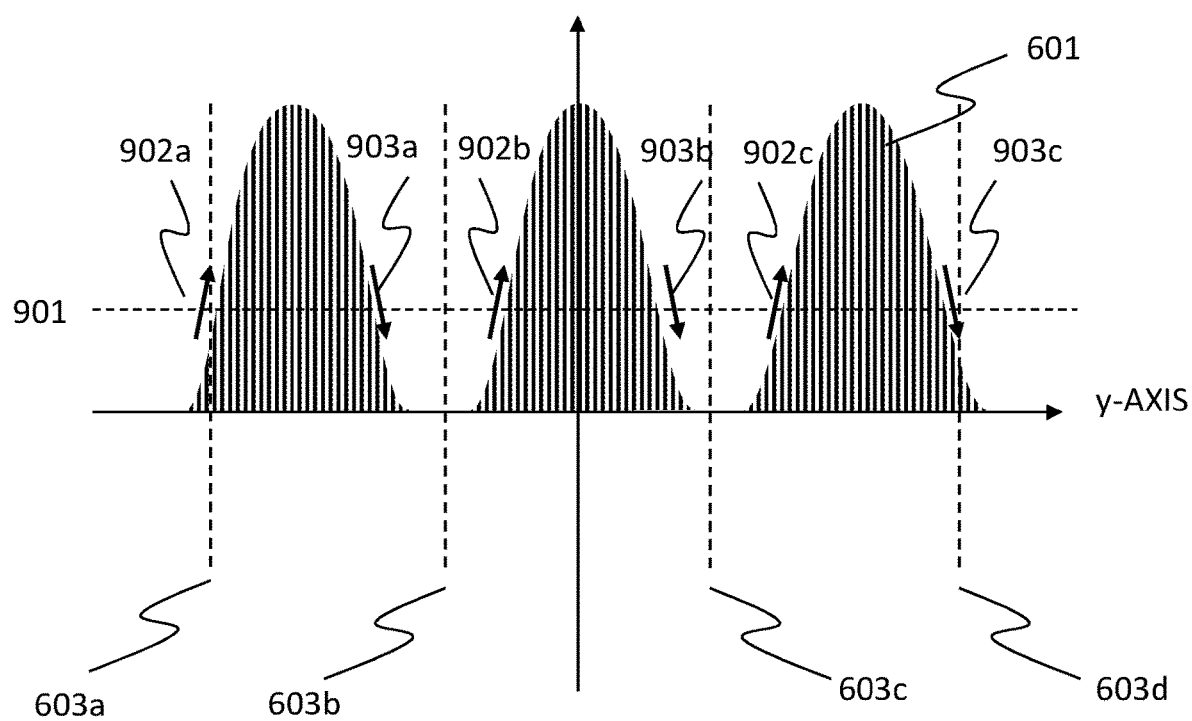
FIG. 9 is a graph showing a concept of processing by an element segmenting unit according to a second embodiment.

FIG. 9 is a diagram describing the concept of processing S406 by the element segmenting unit 803. After extracting the histogram 601, the element segmenting unit 803 searches for the value of the histogram 601 from the smaller portion to the larger portion of the y-axis. Herein, a location where the histogram value exceeds the threshold value 901 is defined as a rising edge 902, and a location where the histogram value falls below the threshold value is defined as a falling edge 903.

The element segmenting unit 803 detects the rising edge 902 following the falling edge 903 and sets the midpoint thereof as the segmentation plane 603. In addition, a first rising edge 902*a* and a last falling edge c are set as the segmentation plane 603.

In addition, the histogram may be searched for from the larger portion of the y-axis to the smaller portion of the y-axis. In this case, the correspondence between the rising edge 902 and the falling edge 903 is reversed.

In addition, two threshold values of a large threshold value and a small threshold value are set as the threshold value 901, and by determining a rising edge in a case where a transition is made in order from the small threshold value to the large threshold value and by determining a rising edge in a case where a transition is made in order from the large threshold value to the small threshold value, t the peaks and valleys can be determined more accurately.

According to the second embodiment, it is possible to automatically determine the segmentation plane.

Third Embodiment

In the third embodiment, an example of what is called a lead-in wire will be described. For example, in the case of an electric line, the lead-in line is an electric line connecting a utility pole to a consumer and usually denotes a line from the utility pole to a lead-in-line attachment point attached to the eaves of a house or the like. Most of the system configuration and the processing flow may be configured similarly to the first embodiment. Hereinafter, the portions different from those of the first embodiment will be described.

Figure 10:
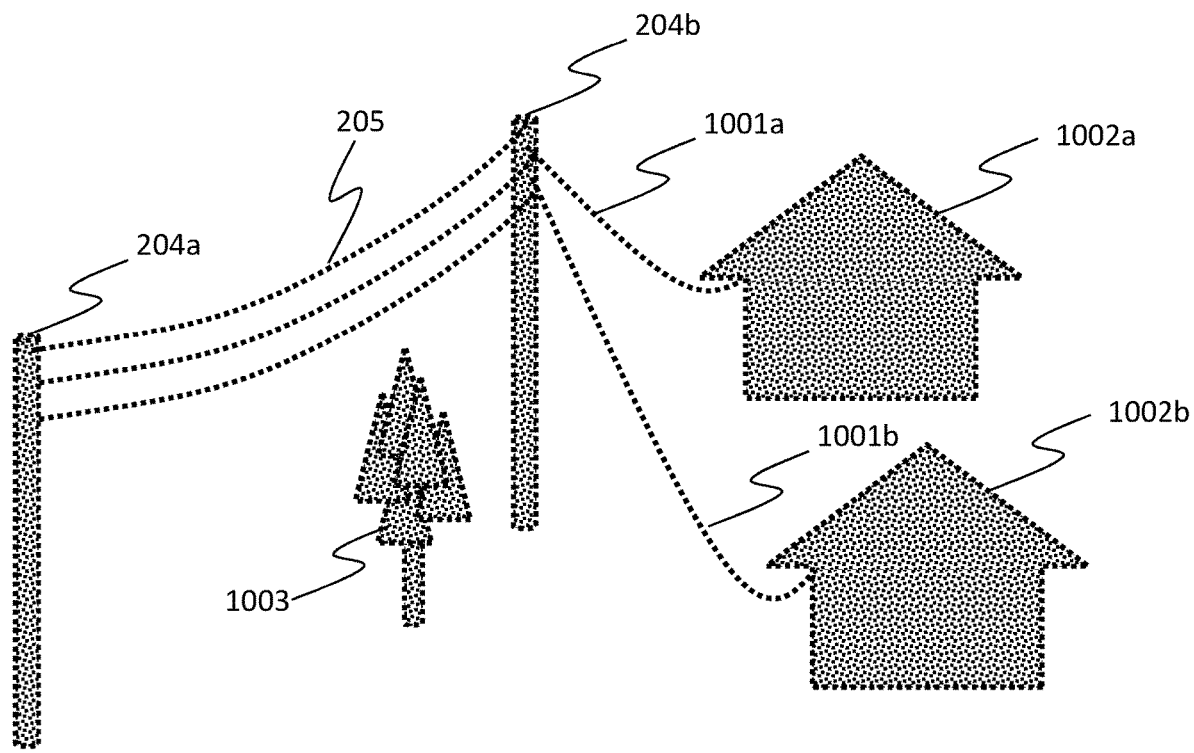
FIG. 10 is a conceptual diagram illustrating a display example of three-dimensional point cloud data including a lead-in line.

FIG. 10 is a display example of a three-dimensional point cloud data including a lead-in line. The lead-in line 1001 from a utility pole 204*b* is connected to the lead-in-line attachment point of a customer 1002. In addition, for example, a point cloud data of trees 1003 is included. In the case of setting such a lead-in line as a target, the case can be dealt with by changing the area-of-interest cropping processing step S402 and the area of interest slicing processing step S404 in the processing according to the first embodiment illustrated in the flow of FIG. 4.

Figure 11:
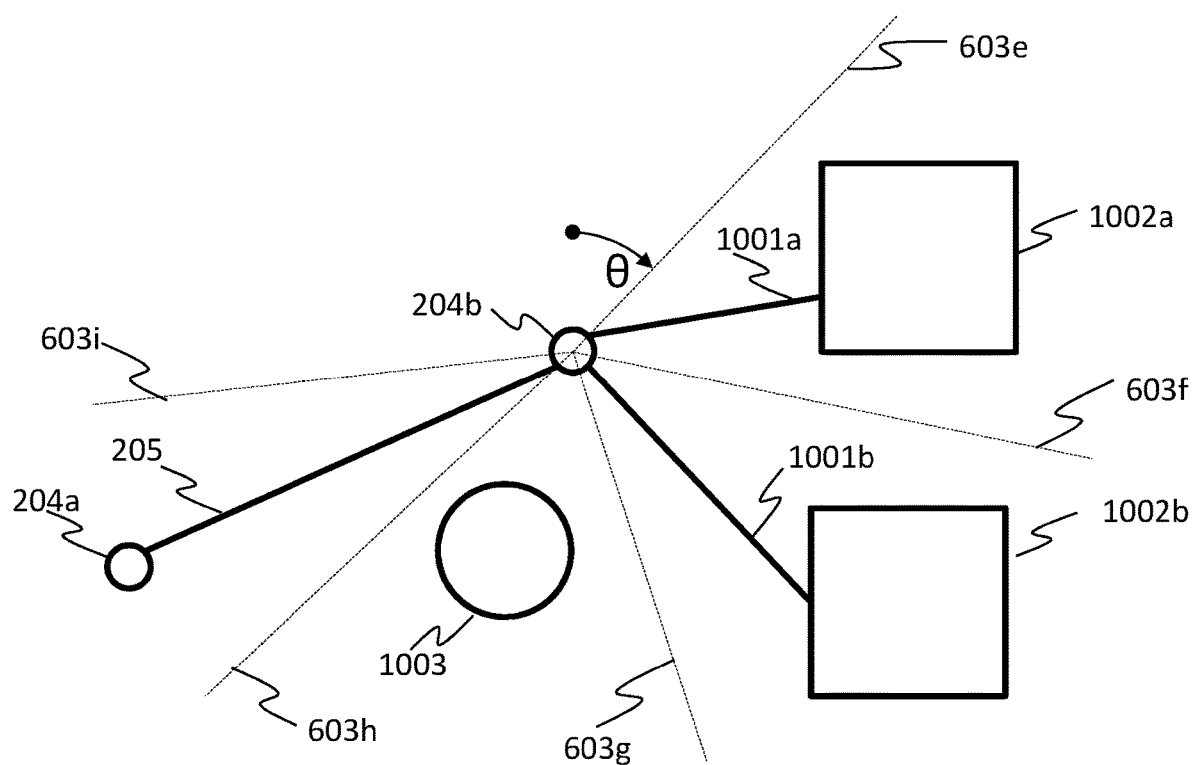
FIG. 11 is a conceptual diagram in which a three-dimensional point cloud including a lead-in line is viewed down from the above.

FIG. 11 is a conceptual diagram in which a three-dimensional point cloud including the lead-in line in FIG. 10 is viewed down from the above. Lead-in lines 1001*a* and 1001*b* are led from the utility pole 204*b* to customers 1002*a* and 1002*b*. In the third embodiment, by designating the utility pole 204*b* in the area-of-interest cropping process S402, a cylinder centered on the utility pole 204*b* is defined as the area of interest. As definition data therefor, the numerical values of the radius r and the height H of the cylinder are stored as the area definition file 807. In addition, after cropping the area of interest, the subsequent processing may be performed by converting to the local coordinate in which the center of the utility pole 204*b* is set as the origin.

In the area of interest slicing process S404, by radially slicing a cylindrical area of interest, in a fan-shaped (but very thin) subdivided area is obtained. Specifically, the cylinder is segmented into a plurality of subdivided areas by a plurality of subdivision planes that are perpendicular to the ground and segment the cylinder at equal angles in the circumferential direction. Therefore, for example, the cylinder is segmented into 360 subdivided areas by one degree. The counting processing step S405 of the score cloud of the subdivided area may be basically similar to that of the embodiment.

Figure 12:
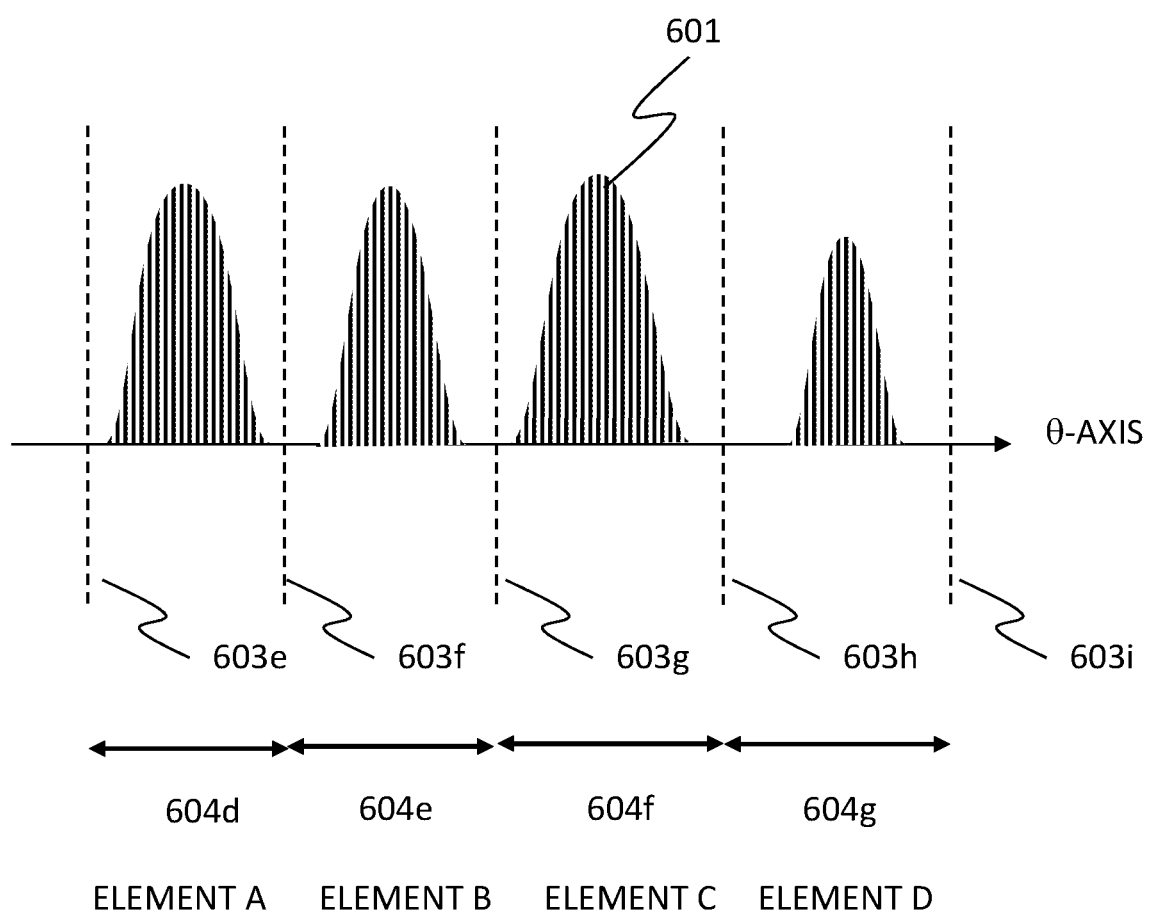
FIG. 12 is a graph showing a concept of processing by an element segmenting unit according to a third embodiment.

FIG. 12 shows a histogram obtained from the three-dimensional point cloud data of FIGS. 10 and 11. In the first embodiment, the horizontal axis is the y-axis, but in the third embodiment, the horizontal axis is defined to have an angle θ. Similarly to the first embodiment, the histogram 601 of the portion in which the point cloud 205 of aerial lines, the lead-in line 1001, or the trees 1003 exist becomes a mountain. Therefore, similarly to the first embodiment, the segmentation plane 603 can be extracted. In the example of FIG. 12, the cylinder is segmented into four segmented areas 604.

In FIG. 12, a segmented area 604*d* includes the lead-in line 1001*a* and the point cloud (element A) of the consumer 1002*a*. A segmented area 604*e* includes the lead-in line 1001*b* and the point cloud (element B) of the consumer 1002*b*. A segmented area 604*f* includes a point cloud (element C) of the trees 1003. A segmented area 604*g* includes the point cloud 205 of aerial lines and the point cloud (element D) of a utility pole 204*a*.

Figure 13:
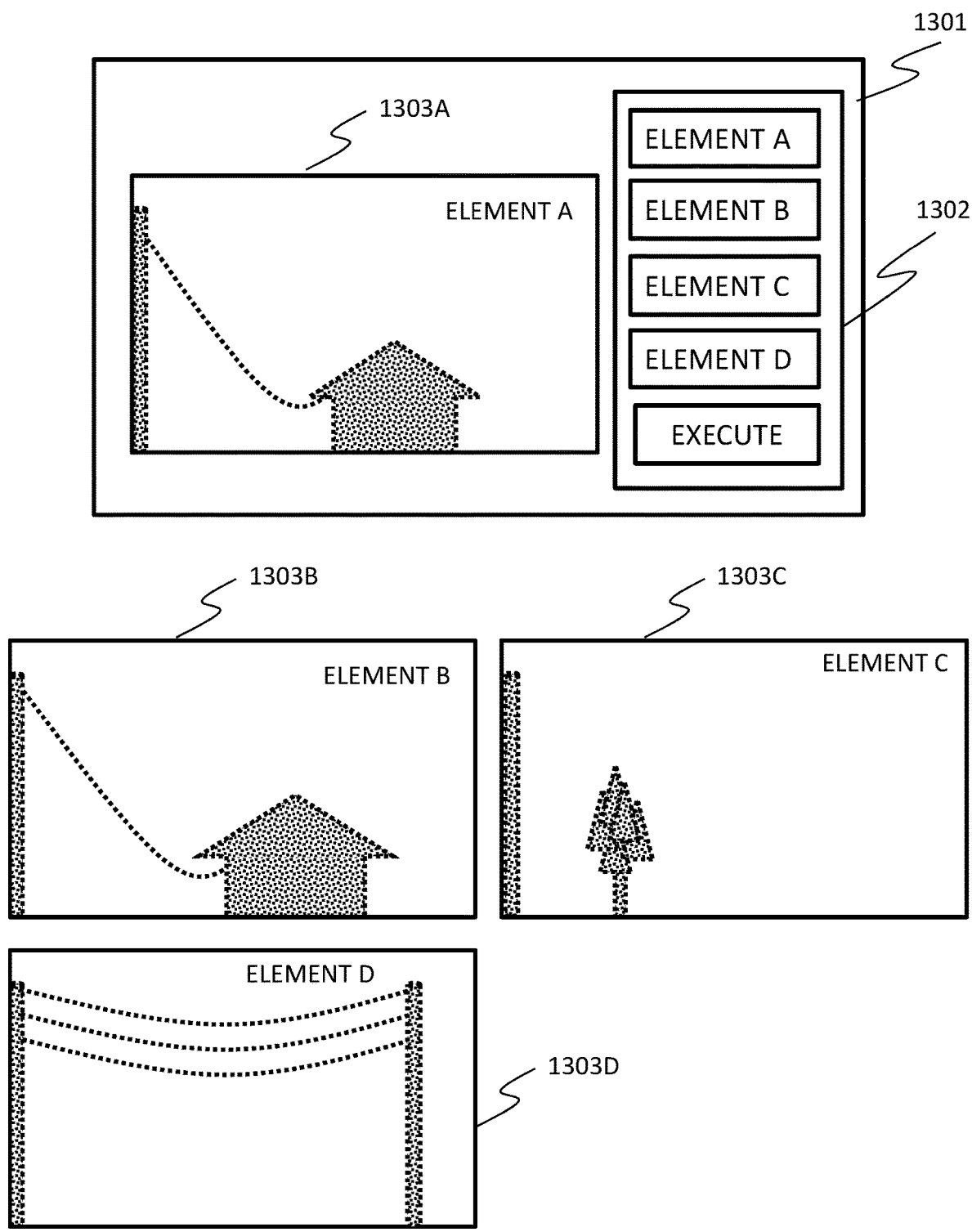
FIG. 13 is an image diagram of an element selection screen displayed on a display according to the third embodiment.

FIG. 13 is a display example of the flow of FIG. 4 and the point cloud selection processing step S408. The element display unit 804 displays a display screen 1301 on the display 810. Manipulation buttons 1302 are displayed on the display screen, and it is possible to selectively display the point cloud (element) included in each of the segmented areas. For example, when the button of the element A is designated with the manipulation button 1302, a screen 1303A displaying the element A is displayed. In addition, by designating the buttons of the element B, the element C, and the element D, screens 1303B, 1303C, and 1303D for displaying the respective elements are displayed. Therefore, the user facilitates selectively designating a desired point cloud.

According to the embodiment described above, by segmenting the three-dimensional point cloud into elements and allowing the user to select the elements, it is possible to solve the problem that, due to the interference of another point in the front direction of the screen, the target point cannot be directly selected. The aerial lines such as electric lines often overlap with each other when viewed from the side, and thus, in many situations, the techniques of the embodiments are required.

INDUSTRIAL AVAILABILITY

The present invention relates to a method of processing a three-dimensional point cloud data, and is particularly applicable to an industry for extracting an aerial line from the three-dimensional point cloud data.

REFERENCE SIGNS LIST

104 Utility pole
105 Aerial line
204 Point cloud of utility pole
205 Point cloud of aerial line
206, 207 Data missing portion
802 Area-of-interest cropping unit
803 Element segmenting unit
804 Element display unit
805 Aerial line supplementation unit

The invention claimed is:

1. An aerial line extraction system, comprising:
an area-of-interest cropping unit that crops a region where an aerial line is assumed to exist as an area of interest by setting a support of the aerial line as a reference from a three-dimensional point cloud data;
an element segmenting unit that segments the area of interest into a plurality of subdivided areas, obtains a histogram by counting three-dimensional point clouds existing in each of the subdivided areas, and obtains a segmentation plane of the area of interest on the basis of the histogram; and
an element display unit that segments the area of interest into a plurality of segmented areas by the segmentation plane and displays the three-dimensional point clouds included in each of the segmented areas in a distinguishable manner,
wherein the element segmenting unit sets a threshold value for the histogram, defines a location where a value of the histogram exceeds the threshold value as a rising edge, defines a location where the value of the histogram falls below the threshold value as a falling edge, and automatically determines the segmentation plane from a positional relationship between the rising edge and the falling edge.

2. The aerial line extraction system according to claim 1, wherein the element segmenting unit segments the area of interest into the plurality of subdivided areas by the plurality of subdivision planes approximately parallel to a longitudinal direction of the aerial line.

3. The aerial line extraction system according to claim 2, wherein the element segmenting unit segments the area of interest into the plurality of subdivided areas having the same shape and volume.

4. The aerial line extraction system according to claim 2, wherein the element segmenting unit can adjust an angle of the subdivision plane.

5. The aerial line extraction system according to claim 1, wherein the area-of-interest cropping unit crops the area of interest by providing a predetermined gap between the support and the area of interest.

6. The aerial line extraction system according to claim 1, wherein the area-of-interest cropping unit crops a rectangular parallelepiped between two supports as an area of interest by setting the two supports as a reference.

7. The aerial line extraction system according to claim 6, wherein the element segmenting unit segments the rectangular parallelepiped into the plurality of subdivided areas by the plurality of subdivision planes that are perpendicular to a ground and parallel to a line connecting the two supports.

8. The aerial line extraction system according to claim 1, wherein the element segmenting unit displays the histogram and obtains the segmentation plane on the basis of information designated by a user corresponding to the display.

9. The aerial line extraction system according to claim 1, wherein the element segmenting unit sets a threshold value for the histogram and automatically determines a location where a value of the histogram is equal to or less than the threshold value as the segmentation plane.

10. The aerial line extraction system according to claim 1, wherein the area-of-interest cropping unit crops a cylinder centered on one support as an area of interest by setting the one support as a reference.

11. The aerial line extraction system according to claim 10, wherein the element segmenting unit segments the cylinder into the plurality of subdivided areas by the plurality of subdivision planes that are perpendicular to a ground and segment the cylinder at equal angles in a circumferential direction.

12. The aerial line extraction system according to claim 1, wherein, at the time of displaying the three-dimensional point cloud included in each of the segmented areas in the distinguishable manner, the element display unit performs at least one of the followings:
(1) a color of the point cloud of the segmented area selected by a user is displayed in a color different from that of the other point clouds, and (2) only the point cloud of the segmented area selected by the user is displayed, and the other point clouds are not displayed; and
(3) only the point cloud in the segmented area selected by the user is allowed to be selectable by the user, and other point clouds are not allowed to be selectable.

13. The aerial line extraction system according to claim 1, further comprising an aerial line supplementation unit, wherein the aerial line supplementation unit supplements a missing portion of the three-dimensional point cloud data of the aerial line to which the point cloud selected by a user by the element display unit belongs.

14. An aerial line extracting method of extracting an aerial line by processing a three-dimensional point cloud data by using an information processing apparatus including a processing device, a storage device, an input device, and an output device, the aerial line extracting method comprising:
a first step of reading the three-dimensional point cloud data including an aerial line and a support of the aerial line from the storage device;
a second step of cropping a region where the aerial line is likely to be included as an area of interest by setting the support of the read three-dimensional point cloud data as a reference;
a third step of segmenting the area of interest into a plurality of subdivided areas having the same shape and the same volume;
a fourth step of counting the number of three-dimensional point clouds included in each of the subdivided areas;
a fifth step of extracting a plane in which a distribution of the three-dimensional point clouds becomes sparse with respect to surroundings as a segmentation plane from a result of the counting; and
a sixth step of segmenting the area of interest by the segmentation plane, classifying the three-dimensional point cloud included in the area of interest into a plurality of elements, and performing at least one of different displays and different processes for each of the plurality of elements,
wherein the step of segmenting the area of interest includes setting a threshold value for the histogram, defining a location where a value of the histogram exceeds the threshold value as a rising edge, defining a location where the value of the histogram falls below the threshold value as a falling edge, and automatically determining the segmentation plane from a positional relationship between the rising edge and the falling edge.

* * * * *